(12) United States Patent
Schumacher

(10) Patent No.: US 11,231,188 B2
(45) Date of Patent: Jan. 25, 2022

(54) TRICKLE STRUCTURES

(71) Applicant: Barnstorfer Kunststofftechnik GmbH & Co. KG, Barnstorf (DE)

(72) Inventor: Egon Schumacher, Barnstorf (DE)

(73) Assignee: Barnstorfer Kunststofftechnik GmbH & Co. KG, Barnstorf (DE)

(*) Notice: Subject to any disclaimer, the term of this patent is extended or adjusted under 35 U.S.C. 154(b) by 258 days.

(21) Appl. No.: 16/484,182

(22) PCT Filed: Feb. 6, 2018

(86) PCT No.: PCT/EP2018/000048
§ 371 (c)(1),
(2) Date: Aug. 7, 2019

(87) PCT Pub. No.: WO2018/149545
PCT Pub. Date: Aug. 23, 2018

(65) Prior Publication Data
US 2019/0353360 A1 Nov. 21, 2019

(30) Foreign Application Priority Data
Feb. 14, 2017 (DE) ...................... 10 2017 001 377.2

(51) Int. Cl.
*F24F 5/00* (2006.01)
*A01K 1/00* (2006.01)
(Continued)

(52) U.S. Cl.
CPC .......... *F24F 5/0035* (2013.01); *A01K 1/0082* (2013.01); *F24F 6/04* (2013.01); *F28F 25/087* (2013.01)

(58) Field of Classification Search
CPC . F24F 5/0035; F24F 6/04; F24F 8/117; A01K 1/0082; F28F 25/087; F28F 25/085;
(Continued)

(56) References Cited

U.S. PATENT DOCUMENTS 2,481,046 A * 9/1949 Scurlock ............... E04C 2/3405
428/593
3,265,550 A * 8/1966 Per .......................... B01J 19/32
156/210
(Continued)

FOREIGN PATENT DOCUMENTS

DE 1913016 A 10/1969
DE 2457803 A1 7/1975
(Continued)

OTHER PUBLICATIONS

WIPO, International Search Report (on priority application), Sep. 5, 2018.
(Continued)

*Primary Examiner* — Emmanuel E Duke
(74) *Attorney, Agent, or Firm* — Laurence P. Colton; Smith Tempel Blaha LLC

(57) ABSTRACT

Trickle bodies for the air conditioning of, in particular, animal housings, that possess only partially latticed layer elements. Trickle bodies are formed of a plurality of sandwiched layer elements that, in known trickle bodies, are formed of corrugated and completely latticed plastics foil. The trickle bodies formed of such layer elements possess a relatively low stability and a limited evaporation capacity. The plastics-formed layer elements of the instant invention are produced by injection molding, allowing layer elements having corrugation heights of more than 12 mm to be formed. Such trickle bodies are more stable, enable a high evaporation capacity and are, moreover, also less permeable to light.

17 Claims, 6 Drawing Sheets

(51) Int. Cl.
*F24F 6/04* (2006.01)
*F28F 25/08* (2006.01)

(58) Field of Classification Search
CPC ......... Y02P 60/50; Y02A 40/70; Y02A 40/76; Y02A 50/20; Y02B 30/54
See application file for complete search history.

(56) References Cited

U.S. PATENT DOCUMENTS

| | | | |
|---|---|---|---|
| 3,599,943 A | 8/1971 | Munters | |
| 3,963,810 A | 6/1976 | Holmberg | |
| 4,186,159 A | 1/1980 | Sulzer | |
| 5,124,087 A * | 6/1992 | Bradley | B01J 19/32 261/112.2 |
| 7,105,036 B2 * | 9/2006 | Shepherd | B01D 45/06 55/343 |
| 7,674,304 B2 * | 3/2010 | Kreil | B01D 1/305 55/440 |

FOREIGN PATENT DOCUMENTS

| | | |
|---|---|---|
| DE | 2722556 A1 | 11/1978 |
| DE | 202006018753 U1 | 4/2008 |
| NL | 7803456 A | 11/1978 |
| WO | 0120241 A2 | 3/2001 |
| WO | 2009153278 A1 | 12/2009 |

OTHER PUBLICATIONS

European Patent Office, Office Action in a Related Application, May 21, 2021.

* cited by examiner

TRICKLE STRUCTURES

CROSS REFERENCE TO RELATED APPLICATIONS

The application is the US National Phase of International Application No. PCT/EP2018/000048 having an International Filing Date of 6 Feb. 2018, which claims the benefit of and priority on German Patent Application No. 10 2017 001 377.2 having a filing date of 14 Feb. 2017.

BACKGROUND OF THE INVENTION

The invention relates to trickle bodies for the air conditioning of buildings, preferably animal housings, having a plurality of mutually connected layer elements, which are corrugated to form alternately adjacent wave troughs and wave peaks, and having flow channels between respectively adjacent corrugated layer elements.

Such trickle bodies, also termed contact bodies, evaporation bodies or insert bodies, are used to air condition rooms, in particular animal housings, by humidification and/or cooling. Such trickle bodies can also serve for the cleaning of air in a building, in particular in an animal housing. The humidification, cooling and/or cleaning is realized according to the evaporation principle. To this end, water or other liquids are fed to the trickle body. Below, only water is mentioned, which is not, however, intended to preclude the use of other liquids.

The water flows through the trickle bodies and here flows downward in and/or on these same. That promotes the evaporation of the water, which results in the desired humidification and cooling of buildings, above all animal housings, and, where appropriate, also the cleaning of the air in buildings and animal housings.

A multiplicity of diverse trickle bodies is known. The evaporation capacity and stability of these same are, however, not yet satisfactory.

BRIEF SUMMARY OF THE INVENTION

The object of the invention therefore lies in providing a trickle body which has an improved evaporation capacity and high stability.

A trickle body for the achievement of this object is a trickle body for the air conditioning of buildings, preferably animal housings, having a plurality of mutually connected layer elements, which are corrugated to form alternately adjacent wave troughs and wave peaks, and having flow channels between respectively adjacent corrugated layer elements, characterized in that the layer elements are, for the one part, of closed-wall configuration and, for the other part, of permeable configuration, to form partially closed and partially permeable flow channels, and/or wave troughs and wave peaks, between adjacent layer elements. The individual plate-like layer elements of these trickle bodies possess a partially open, in particular latticed or meshed and partially closed surface. Preferably, also the wave troughs and wave peaks formed due to the corrugation of the layer elements are hence, for the one part, closed and, for the other part, permeable, in particular in a latticed or meshed pattern. Preferably, flow channels formed by their corrugation between adjacent layer elements have, for the one part, closed and, for the other part, permeable, preferably latticed or meshed, walls. As a result of the alternately closed and permeable surfaces or walls, it has been shown that trickle bodies configured in such a way boast better air conditioning characteristics or a better evaporation capacity. Moreover, such trickle bodies are more stable, which, in particular, is advantageous when they are stacked one upon another.

Preferably, it is provided that a direction of longitudinal extent of the wave troughs and wave peaks runs transversely to the preferably upright layer elements. In particular, the wave troughs and wave peaks run continuously between parallel upright longitudinal edges of the layer elements. As a result, the water can preferably be introduced from above into the trickle bodies, and so trickle down on the partially perforated and partially latticed or meshed surfaces or walls of the layer elements and/or wave troughs and wave peaks.

As a result of the partially closed and partially permeable walls or surfaces of the layer elements and their wave troughs and wave peaks, the trickle bodies boast a lower flow resistance and are, moreover, opaque and admit no, or only a little, passage of light.

In a preferred embodiment of the trickle body, the wave troughs and wave peaks of its layer elements are provided with a course having preferably at least one change of direction, preferably a zigzagging and/or serpentine course. Accordingly, the flow channels run in a zigzagging and/or serpentine course between the respectively adjacent layer elements. Given such a course, the alternately closed and open, in particular latticed or meshed, surfaces of the layer elements and/or of the walls of the wave troughs and peaks result in a particularly low flow resistance and a high degree of evaporation.

In the particularly advantageously configured trickle body, the wave troughs and/or peaks of the layer elements possess outer portions, which emanate from each of the opposite, preferably perpendicular, longitudinal edges of the layer elements and run transversely to the longitudinal edges, and the outer portions possess oppositely inclined inner portions, which continue the outer portions to the middle of the layer elements and/or connect them one to another. The inner portions meet at an apex point lying on the middle of the respective layer element, in particular midway between the parallel outer longitudinal edges of the layer elements. The wave troughs and peaks thus possess, viewed in their direction of longitudinal extent, an inner V-shaped course, which is continued outward by the horizontal outer portions. This configuration of the wave troughs and wave peaks, preferably the thereby formed flow channels, permit a particularly effective homogeneous supply of water to the inside of the respective trickle body. Moreover, these courses of the wave troughs and peaks and flow channels result in the trickle body being at least for the most part impermeable to light, and to it not being possible to look through the trickle body.

Preferably, it is provided that the impermeable, preferably watertight parts of the surfaces of the layer elements, in particular of their wave troughs and wave peaks and/or flow channels, are located in at least one inner region of the inner portions of the wave troughs and peaks and/or flow channels of the layer elements.

Preferably, the impermeable inner regions of the inner portions run over a large part of these same, but not over opposite short end regions of the inner portions, in particular not in the apex region. Since the impermeable regions extend over just an inner large part of the inner portions, the water is prevented from collecting in the lower-lying middle apices or apex regions of the inclined inner portions and from thereby being able to reduce the flow cross section, which could lead to an increase in the flow resistance, in particular in the throughflow resistance, of the trickle body.

In a preferred embodiment of the trickle body, the layer elements are assembled such that they are alternately turned in such a way that the oblique inner portions of mutually facing wave troughs and peaks of adjacent layer elements are inclined in opposite directions and/or run in cross-cross arrangement. That results in a particularly homogeneous distribution of the supplied water inside the trickle bodies.

One possibility of the refinement of the trickle body provides that the waves, preferably all wave troughs and wave peaks, of the respective layer element have trapezoidal cross sections having respectively two oppositely obliquely inclined side members, which are connected by a common web. Preferably, only the obliquely inclined side members of the waves, in particular wave troughs and/or wave peaks, are, for the one part, of closed configuration and, for the other part, of permeable configuration. An optimal exchange of material is thereby ensured.

It can further be provided that the permeably configured parts of the layer elements, in particular of the flow channels and/or wave troughs and/or wave peaks, of the layer elements are of meshed and/or latticed configuration or are formed by a mesh and/or lattice structure. As a result, the stability of the layer elements and of the trickle body formed therefrom is not significantly weakened by the permeably configured parts of the layer elements or of their flow channels, wave troughs and/or wave peaks.

A further trickle body for the achievement of the object stated in the introduction, wherein this can also be constituted by a preferred refinement of the previously described trickle body, is a trickle body for the air conditioning of buildings, preferably animal housings, having a plurality of mutually connected layer elements, which are corrugated to form alternately adjacent wave troughs and wave peaks, and having flow channels between respectively adjacent corrugated layer elements, characterized in that the corrugated layer elements are injection molded from plastic. Hence it is provided that the corrugated layer elements are injection molded from plastic. Such layer elements are able to be formed with great accuracy, in particular same cross sections and, above all, equal-sized cross sections, of wave troughs and peaks lying one above the other. Moreover, the plastics-molded layer elements boast a greater stability than is the case in known trickle bodies having layer elements formed of corrugated foil. By injection molding, absolutely identical plastics layer elements are also able to be produced. Layered elements produced by injection-molding can, moreover, have a greater corrugation height than is the case in corrugated layer elements produced in some other way. As a result, deeper wave troughs and higher wave peaks are able to be formed, and corresponding cross sections of the flow channels are able to be enlarged and/or adapted to the given requirements. Finally, greater corrugation heights of the layer elements lead to lower flow resistances in the trickle bodies.

Preferably, it is provided that all layer elements are the same and/or all layer elements are configured the same, preferably all layer elements are injection molded in equal measure from plastic. From many same layer elements, by simple connection of the same by bonding, welding, sealing or the like, trickle bodies comprising wave troughs and peaks having mutually equal dimensions, and also comprising substantially identical flow channels, are able to be formed. That results in an equality of flow ratios between all layer elements.

A further trickle body for the achievement of the object stated in the introduction, wherein this can also be constituted by preferred refinements of all previously described trickle bodies, is a trickle body for the air conditioning of buildings, preferably animal housings, having a plurality of mutually connected layer elements, which are corrugated to form alternately adjacent wave troughs and wave peaks, and having flow channels between respectively adjacent corrugated layer elements, characterized in that the corrugation heights of the layer elements are greater than 12 mm, preferably greater than 20 mm. Such a trickle body is distinguished by a corrugation height of the layer elements which is greater than 12 mm. Such a corrugation height results in relatively large flow cross sections and thereby reduced flow resistances in the relevant trickle body. That applies in particular in combination with trickle bodies in which the surfaces or walls of the layer elements, wave troughs, wave peaks and/or flow channels are only partially permeable, thus both permeable and impermeable. Such relatively large corrugation heights are able to be realized particularly well by production of the layer elements by injection molding. Finally, by virtue of large corrugation heights, the number of layer elements per trickle element can be reduced compared to those of the kind having equal corrugation height.

It is particularly advantageous to choose the corrugation heights of the layer elements such that they lie within the range from 12.5 mm to 30 mm and—which is still more advantageous—between 13.5 mm and 18 mm or 20.5 mm to 30 mm. Trickle structures formed from thus configured layer elements, in particular when they have partially open and partially closed walls or surfaces, boast surprisingly low flow resistances, combined with nevertheless high evaporation capacity.

In a preferred embodiment of the trickle body, the waves or wave troughs and wave peaks possess trapezoidal cross sections, having oppositely obliquely directed sides and a web which connects these. Preferably, the wall of the web of each wave trough and each wave peak is completely impermeable, in particular closed, fully over the entire length of each wave peak or wave trough of every layer element. The webs of all wave troughs and wave peaks lie in two parallel planes, the distance between which corresponds to the corrugation height of the respective layer element. These are the planes at which adjacent layer elements lie close together and are connected to one another throughout or in some regions, in particular at selected points, by, for example welding, bonding and/or sealing. Since these webs, which constitute, so-to-speak, bearing surfaces and connecting surfaces, are closed throughout, thus have no openings or through holes, they form sufficiently large bearing surfaces, which permit a simple and reliable connection of adjacent layer elements, but also result in a relatively large stability of the out of a plurality of layer elements connected to one another at the closed-face webs, and of the trickle bodies formed therefrom.

BRIEF DESCRIPTION OF THE DRAWINGS

A preferred illustrative embodiment of a trickle body according to the invention is explained in greater detail below on the basis of the drawing, in which.

DETAILED DESCRIPTION OF PREFERRED EMBODIMENTS

Figure 1:
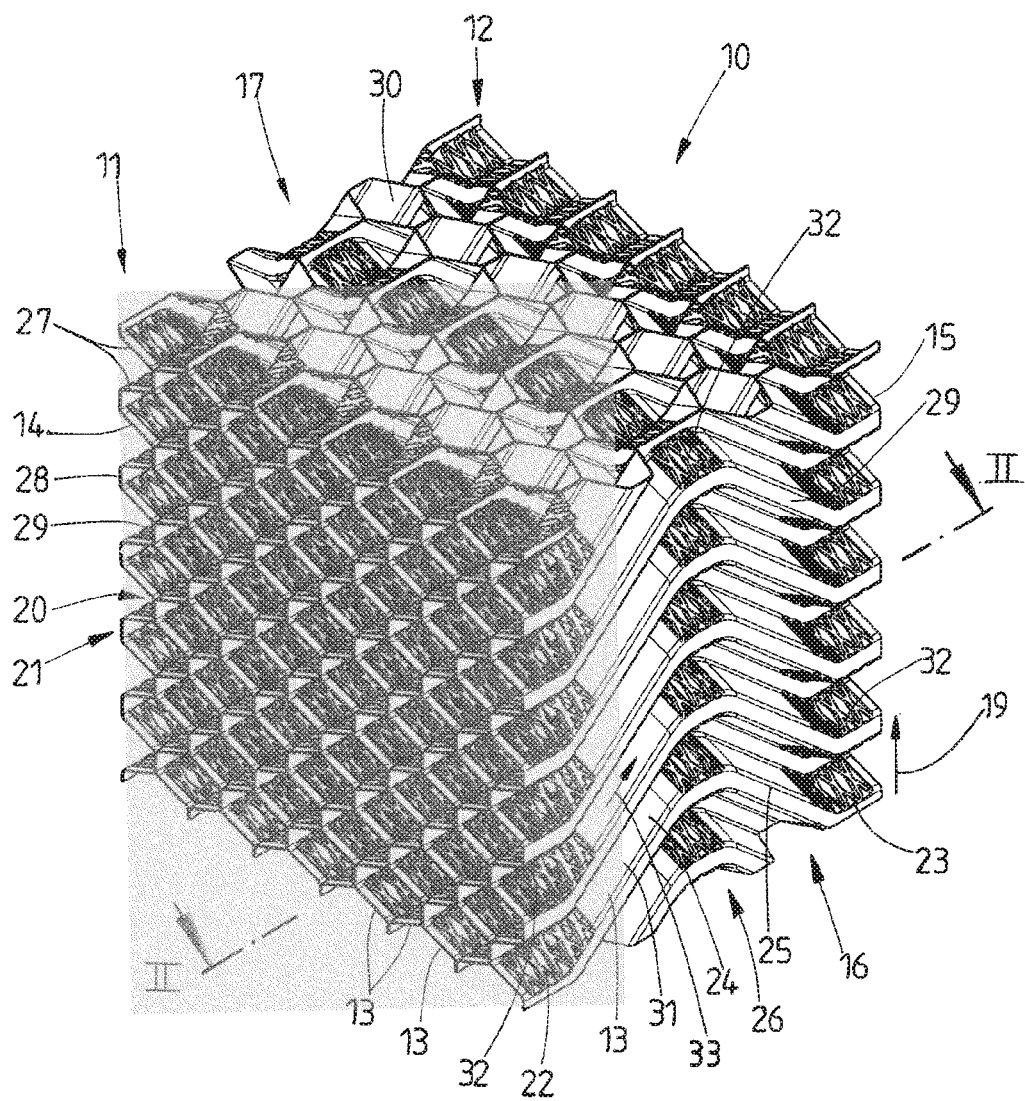
FIG. 1 shows a perspective representation of a detail of the trickle body.
Figure 2:
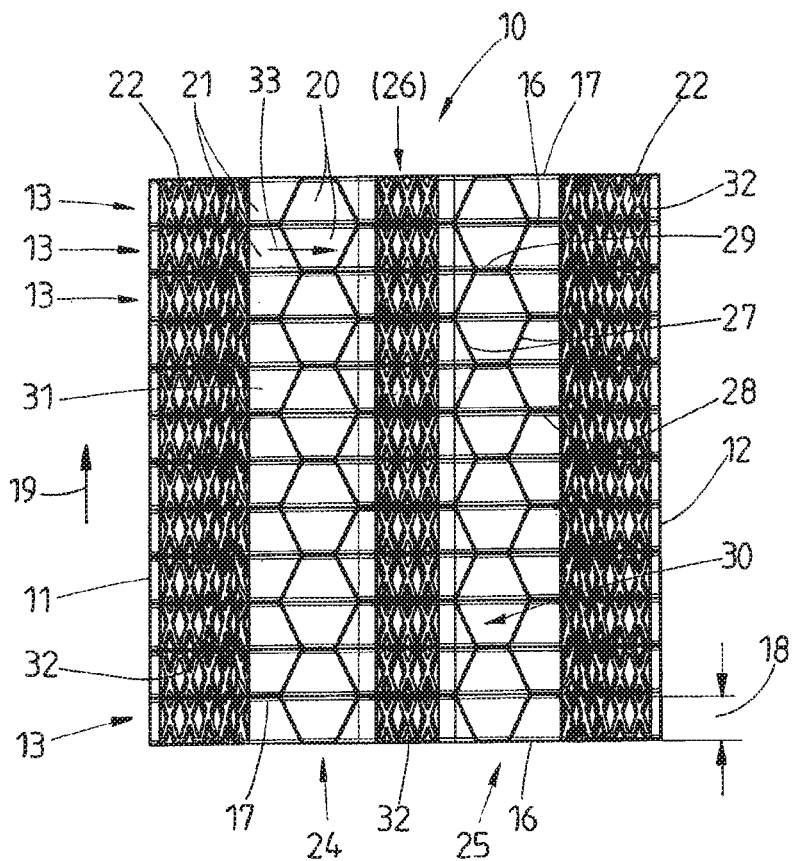
FIG. 2 shows a cross section II-II through the trickle body of FIG. 1.

The figures show wholly or in part a trickle body 10 for the air conditioning of buildings, in particular animal housings, according to the evaporation principle. To this end, water, or, where appropriate, also a different liquid, is fed from above to the trickle body 10, which then, preferably by force of gravity, flows downward through the trickle body 10. This can solely be constituted by water, but can also be constituted by a water-air mixture, thus a water mist. The water and/or the water mist are conducted at appropriate pressure, and a thereto corresponding flow velocity, into the trickle body 10 and, by virtue of the structure of the trickle body 10, in substantially homogeneous distribution through this same.

The trickle body 10 consists fully of plastic, in particular thermoplastic plastic, and is produced by plastics injection molding using at least one injection mold.

Each elongate and generally upright (cf. FIGS. 3 and 5 to 7) trickle body 10 consists of a plurality of altogether same layer elements 13 made of plastic, preferably thermoplastic plastic, which are respectively individually produced by injection molding. For the formation of the trickle body 10 from the individual layer elements 13, these are mutually connected, following their production by injection molding, by welding, bonding, sealing or similar. As a result, the trickle body 10, which is structured in a layered or sandwich-like manner, is formed from a plurality of layer elements 13, which are arranged lying one behind the other and are connected to one another.

The elongate layer elements 13 are assembled in the upright state, thus vertically, and connected to one another. As a result, parallel longitudinal side edges 14, 15 run on opposite sides of the layer elements 13 in upright arrangement, in particular perpendicularly. The longitudinal side edges 14, 15 of all connected layer elements 13 lie in or on opposite, parallel longitudinal side planes 11 and 12 of the trickle body 10.

The respective layer element 13 is of structured and/or profiled configuration. In the shown illustrative embodiment, the respective layer element 13 is of corrugated configuration. Each layer element 13 thereby acquires a three-dimensional structure having a front plane 16 and a rear plane 17. Both planes 16 and 17 of each layer element 13 run at a parallel distance apart, wherein preferably the distance between the planes 16, 17, with deduction of the wall thickness of the layer element 13, corresponds to the corrugation height 18 of the respective layer element 13.

The corrugation of the layer elements 13 is realized in the direction of longitudinal extent 19 of the trickle body 10, thus from top to bottom. As a result, wave troughs 20 and wave peaks 21 alternately follow one upon the other in the direction of longitudinal extent 19. In the here shown orientation of the trickle body 10, there respectively follows above a wave trough 20 a wave peak 21. Above this is then again found a wave trough 20, and so on. A wave longitudinal direction 33 of the wave troughs 20 and wave peaks 21 runs, at least in part, transversely to the direction of longitudinal extent 19, thus. continuously between the longitudinal side edges 14 and 15 of the layer elements 13, and therefore between the longitudinal side planes 11 and 12 of the trickle bodies 10.

The wave troughs 20 and wave peaks 21 can fundamentally have any chosen course. In the shown trickle body 10, the wave troughs 20 and the adjacent wave peaks 21, in their wave longitudinal direction 33 running transversely to the direction of longitudinal extent 19 of the trickle body 10, are provided with a corrugated course. Preferably, the wave troughs 20 and wave peaks 21 have a same zigzagging or serpentine course.

In the shown trickle body 10, each wave trough 20 has, just like each wave peak 21, two, in particular same, outer portions 22 and 23, and two, also preferably same, inner portions 24 and 25. An outer portion 22 of the wave trough 20 or wave peak 21 emanates from the longitudinal side plane 11 of the trickle body 10, while the opposite outer portion 22 begins on the opposite other longitudinal side plane 12 of the trickle body 10. The outer portions 22 and 23 run perpendicular to the longitudinal side plane 12, 13, thus, if the trickle body 10 is standing upright, in a horizontally directed course.

On the inner side, each outer portion 22 and 23 is continued by an oblique inner portion 24 or 25, which runs either in an obliquely upwardly directed course or an obliquely downwardly direct course. The inner portions 24 and 25 emanating from the opposite outer portions 22 and 23 are oppositely inclined, but in equal measure, for instance by 20° to 60° to the horizontal or to the outer portion 22, 23, preferably 30° to 50°, in particular around 40°. The inner portions 24 and 25 of opposite sides of the trickle body 10 meet in the vertical longitudinal center plane of this same, lying midway between the longitudinal side planes 11 and 12 of the trickle body 10. There is here found an apex 26 of each wave trough 20 and wave peak 21 running in a serpentine or zigzagging course between the longitudinal side planes 11 and 12 of the trickle body 10. At the same time, in the apex 26 located on the longitudinal center plane of the trickle body 10 is found the highest or lowest point of the respective wave trough 20 and wave peak 21.

The transitions between the outer portions 22 and 23 and the thereto adjoining inner portions 24 and 25, and between the inner portions 24, 25, meeting in the longitudinal center plane of the trickle body 10, of the wave troughs 20 and wave peaks 21, are, in the shown illustrative embodiment, rounded.

Figure 4:
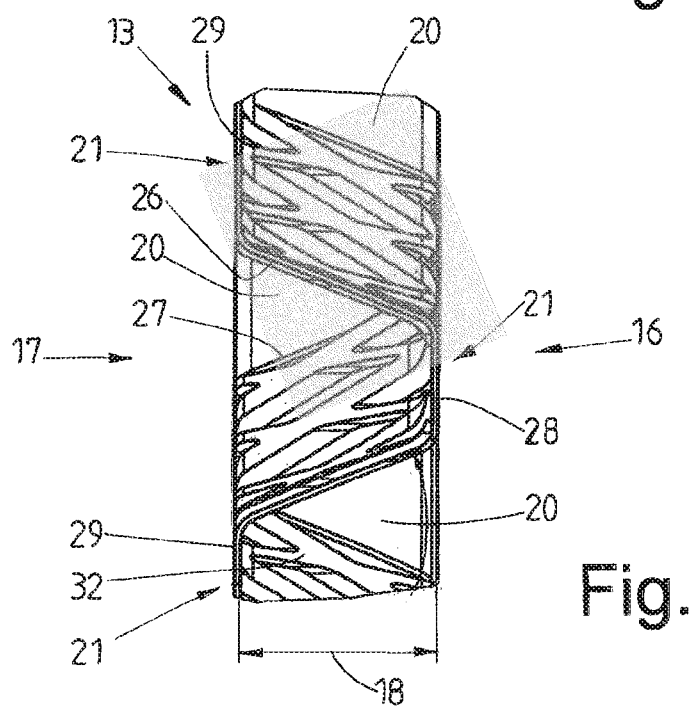
FIG. 4 shows an enlarged detail IV from FIG. 3.
Figure 3:
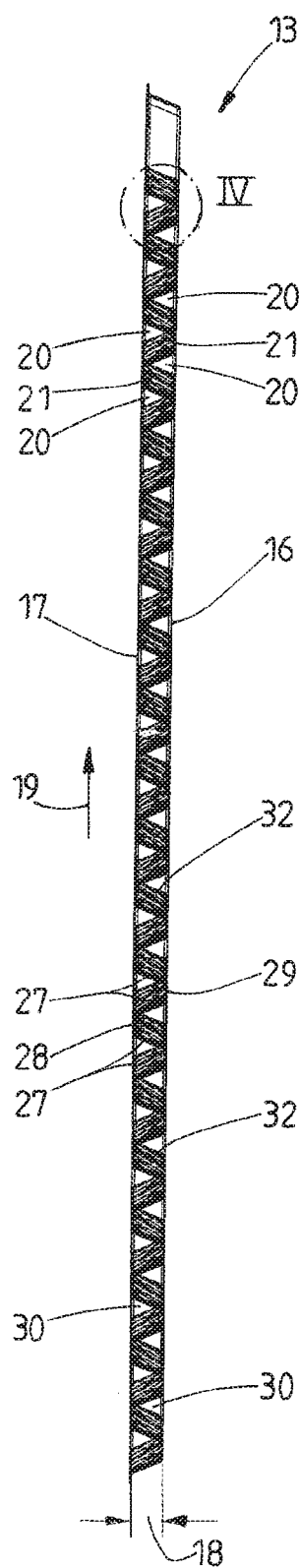
FIG. 3 shows a middle longitudinal section through the trickle body of FIG. 1.

The corrugations of the respective layer element 13, in particular the cross section of each wave trough 20 and wave peak 21, are formed in equally trapezoidal configuration by oppositely and equally slanted side members 27. Respectively two side members 27 delimit opposite sides of a wave trough 20 and wave peak 21. The side members 27 are connected at the highest point of the respective wave peak 21 by a web 28 and at the lowest point of the respective wave trough 20 by a web 29. The opposite side members 27 converge in the direction of the web 28 or 29, so that the width of each wave peak 21 to the web 28 decreases, and also the width of each wave trough 20 to the web 29 decreases (FIG. 4). The webs 29 of all wave troughs 20 lie in a common plane, to be precise, in the shown illustrative embodiment, on the front plane 16, of the respective layer element 13. In contrast, the webs 28 of all wave peaks 21 of the relevant layer element 13 lie jointly in the rear plane 17 of this same (FIG. 4). As a result, at least parts or portions of the webs 28 and 29 form bearing surfaces for the connection of adjacent, same configured layer elements 13. The distances apart of the webs 28 and 29 of the front plane 16 and of the rear plane 17 here predefine the corrugation heights 18 of the layer elements 13, and thus also the depth of the respective wave trough 20 or height of the respective wave peak 21.

The corrugation height 18 of each layer element 14, thus the clear or inner depth of each wave trough 20 and/or of each wave peak 21, measures, in the shown trickle body 10, around 14 mm. It can, however, also be larger or smaller, to be precise 13.5 mm to 18 mm, where appropriate even within the range from 12.5 mm to 30 mm.

Figure 5:
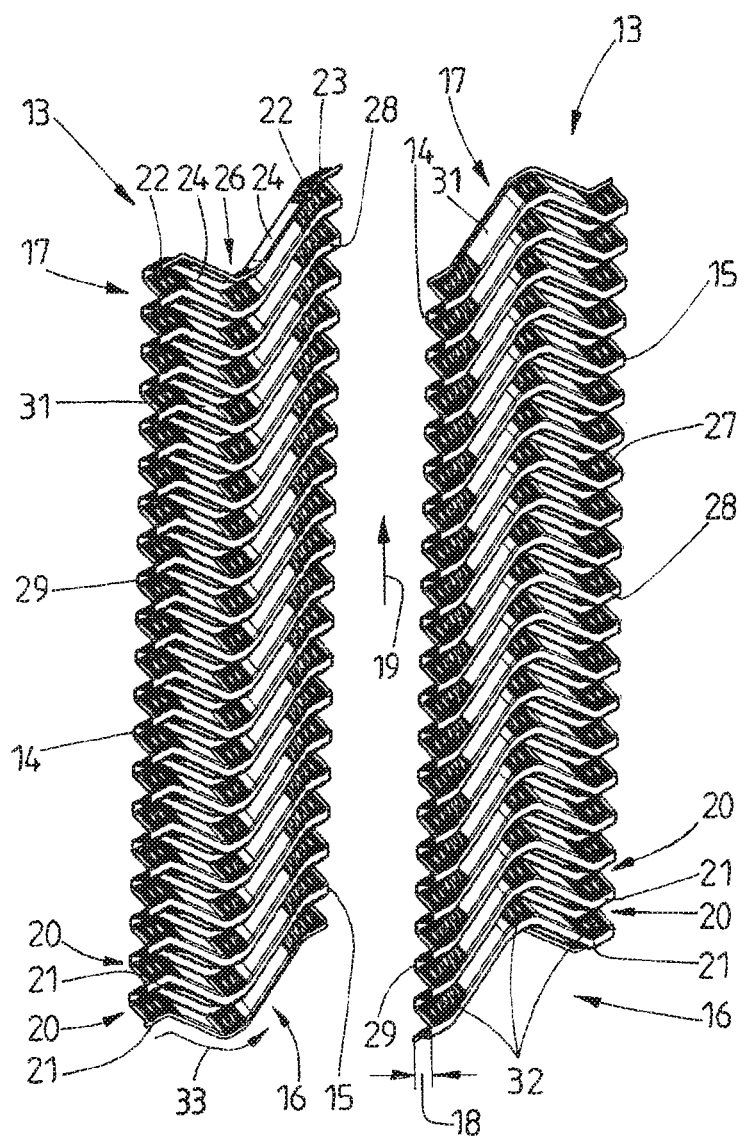
FIG. 5 shows two adjacent layer elements, represented in perspective view, of the trickle body prior to assembly.
Figure 6:
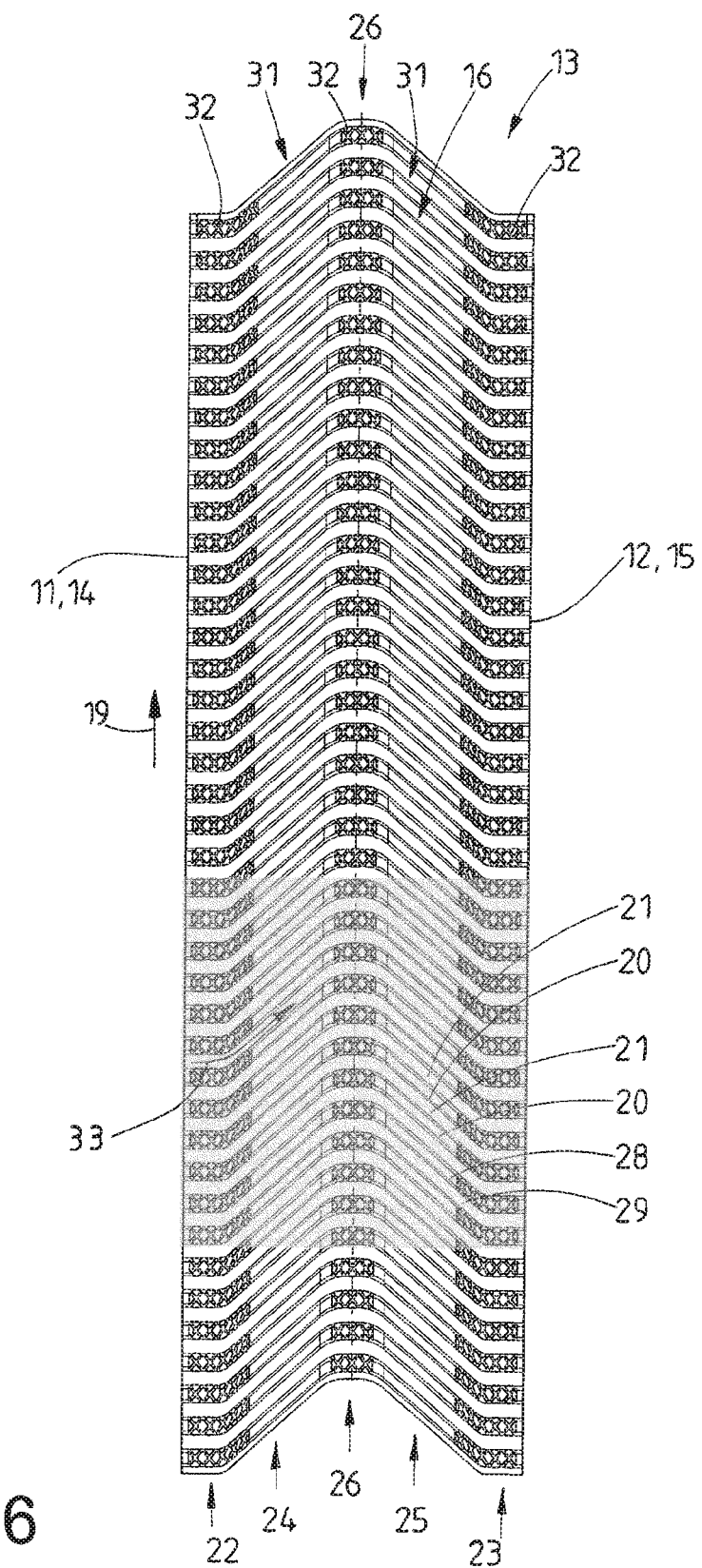
FIG. 6 shows a front view of a layer element.

In the here shown trickle body 10, the individual layer elements 13 follow one upon another in alternating orientation. There is always respectively arranged between two same oriented layer elements 13 an inverted layer element 13 (FIG. 5). In other words, following upon each layer element 13 which is oriented around in this way, as represented in FIG. 6, is a layer element 30 which is inverted through 180° but is otherwise the same, according to the representation in FIG. 7. A layer element 13 of this kind is inverted about a normal axis through the front plane 16 and/or rear plane 17 of the relevant layer element 13.

Because an inverted layer element 13 is arranged between two layer elements 13 which stand upright with same orientation, the apices 26 of the wave troughs 20 and wave peaks 21, which apices are located on the longitudinal center plane of the trickle body 10, lie, related to their wave longitudinal direction 33, alternately, or in turn, above and below the outer portions 22 and 23. The result is that that oppositely obliquely directed inner portions 24, 25 of adjacent layer elements 13 intersect (FIG. 5). By contrast, despite the layer elements 13 which follow one upon another alternately a different way round, the outer portions 22 and 23 of the wave troughs 20 and wave peaks 21, which outer portions run transversely to the longitudinal side edges 14, 15, thus preferably horizontally, lie congruently one behind the other, so that they complement each other, since alternately two wave troughs 20 and two wave peaks 21 follow one upon another or lie one behind the other to form portions of flow channels 30, which thereby acquire a honeycomb-like, hexagonal cross section.

Due to the successive corrugated layer elements 13, a uniform lattice of a multiplicity of flow channels 30 lying one above the other and one behind the other is formed in the trickle body 14. Each flow channel 30 extends from one longitudinal side plane 11 continuously to the other longitudinal side plane 12 of the trickle body 10. However, the cross sections, in particular sizes, of the flow channels 30 change, in the direction of longitudinal extent 19 of the wave troughs 20 and/or wave peaks 21, in the regions of the inner portions 24 and 25. In part, in particular in the regions of the outer portions 22, 23, each flow channel 30 is formed by adjacent, mutually opposing wave troughs 20 between adjacent layer elements 13.

In the region of the outer portions 22, 23 of the wave troughs 20, which outer portions run transversely to the longitudinal side planes 11, 12, preferably horizontally, major parts of the flow channels 30 are formed from two congruently successive, adjacent wave troughs 20. These outer parts of the flow channels 30 thus possess an approximately hexagonal cross section. In the region of the inner portions 24, 25 of the wave troughs 20 of adjacent layer elements 13, lesser parts of the respective flow channel 30 are formed. These come into being as a result of the alternately inverted succession of layer elements 13 and the thereby intersecting inner portions 24, 25. Only at the intersections of the inner portions 24, 25 of the wave troughs 20 of adjacent layer elements 13 do the wave troughs 20 of adjacent layer elements 13 partially overlap, so that, here too, short parts of larger flow channels 30 are formed.

The layer elements 13 possess, for the one part, closed, liquid-impermeable wall regions 31 and, for the other part, permeable wall regions 32. The permeable wall regions 32, preferably all permeable wall regions 32, are, in the shown trickle body 10, of meshed or latticed configuration.

In the trickle body 10 of the here described illustrative embodiment, the closed edge regions 31 are located in the region of the inner portions 24, 25, preferably only in central segments of these same. Opposite end regions of the inner portions 24, 25 are then configured as permeable wall regions 32, to be precise in particular in the region of the respective apices 26 of the wave troughs 20 and wave peaks 21, preferably also short end regions, bordering the outer portions 22 and 23, of the inner portions 24, 25. In the shown illustrative embodiment, the outer portions 22 and 23 are fully configured as permeable wall regions 32.

The permeable wall regions 32 of the wave troughs 20, and of wave peaks 21 and/or flow channels 30, are provided only in the opposite, oppositely obliquely directed side members 27 of the wave troughs 20 and wave peaks 21. The webs 28 and 29 of the wave troughs 20 and wave peaks 21, on the other hand, are configured continuously, and/or in full, as closed wall regions 31. As a result, wherever adjacent layer elements 13 touch one another at webs 28 and 29 of the wave peaks 21 and wave troughs 20, constantly closed wall regions 31, namely complete walls of non-meshed or non-latticed configuration, of the layer elements 13 are present. At these closed walls, namely closed wall regions 31, the adjacent layer elements 13 can be connected to one another, by welding, sealing and/or bonding, permanently and with sufficient durability, to be precise despite the wave troughs 20 and wave peaks 21 which run in a serpentine and or zigzagging course in their direction of longitudinal extent 19, as well as the alternately inverted succession of the otherwise same layer elements 13.

Owing to the all-round closed wall regions 31 of central and/or inner parts of the inner portions 24 and 25 of the wave troughs 20 and wave peaks 21, in the flow channels 30 obliquely directed drain channels for water or water mist fed from above to the trickle bodies 10 are created. Owing to the alternately inversely succeeding layer elements 13, these closed-walled drain channels are alternately directed outward to the outer portions 22, 23 comprising permeable wall regions 32, or inward to the permeable wall region 32 in the region of the respective apex 26 of the inner portions 24 and 25. The aforementioned distribution and arrangement of the closed wall regions 31, on the one hand, and of the permeable wall regions 32, on the other hand, ensure a homogeneous distribution of the water or of the water mist as this flows in a downward direction through the respective trickle body 10.

Figure 7:
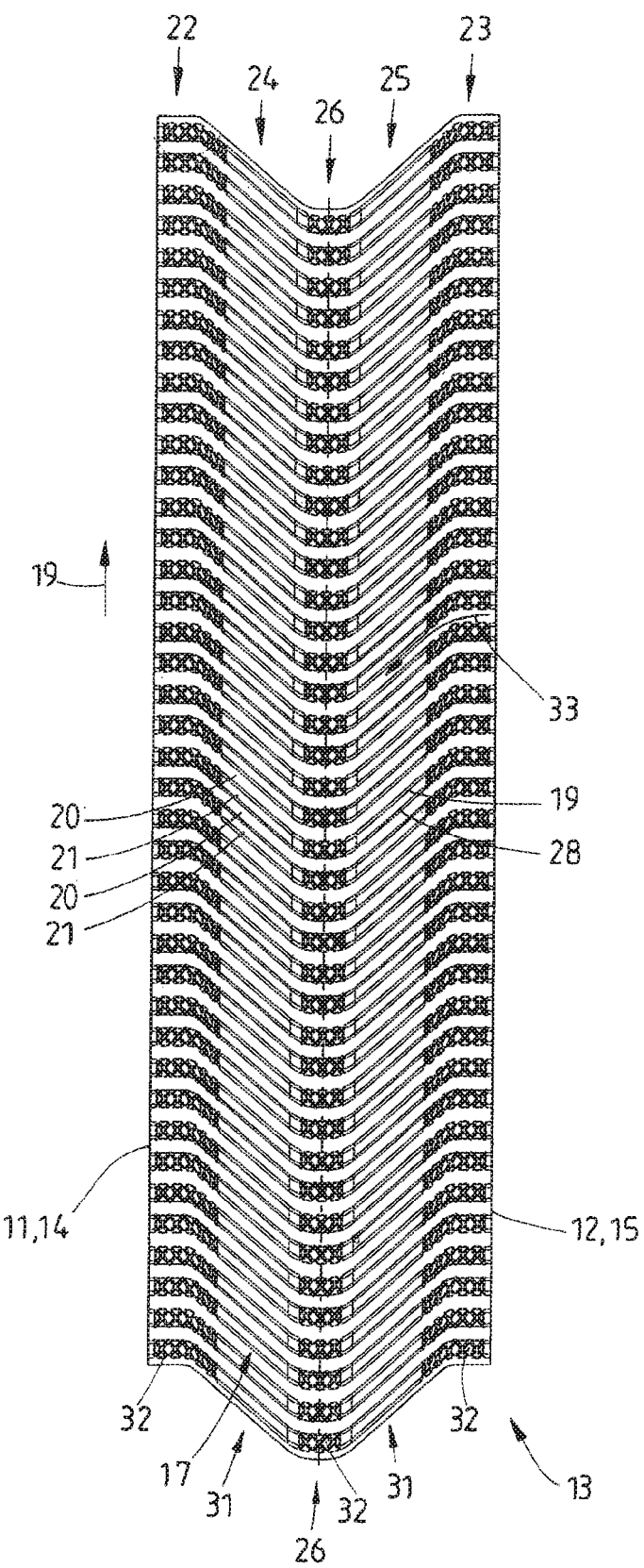
FIG. 7 shows a front view of an adjacent layer element to the layer element of FIG. 6.

In particular, FIGS. 6 and 7 show the respective layer element 13 with an upwardly curved upper transverse edge and a correspondingly inwardly curved lower transverse edge. As a result, the upper edge and the lower edge of the respective layer element 13 possess an arcuate or wavelike curvature, and hence a continuous wave trough 20 or a continuous wave peak 21.

An alternative illustrative embodiment of a trickle body 10 is conceivable, in which the upper and lower transverse edges of the layer elements 13 run in a straight line. In these layer elements 13, the raised and projecting curvature on the upper transverse edge is—figuratively speaking—virtually cut off, and the inwardly directed curvature on the lower transverse edge filled up by what is cut off at the upper transverse edge. As a result, in the respective layer element 13 of this alternative illustrative embodiment, a rectilinear lower transverse edge is also formed. The trickle body 10 composed of a plurality of adjacent layer elements 13 in this case possesses a plane and flat upper and lower end face.

REFERENCE SYMBOL LIST 10 trickle body
11 longitudinal side plane
12 longitudinal side plane
13 layer element
14 longitudinal side edge
15 longitudinal side edge
16 front plane
17 rear plane
18 corrugation height
19 direction of longitudinal extent
20 wave trough
21 wave peak
22 outer portion
23 outer portion
24 inner portion
25 inner portion
26 apex
27 side member
28 web
29 web
30 flow channel
31 closed wall region
32 permeable wall region
33 wave longitudinal direction

The invention claimed is:

1. A trickle body for the air conditioning of buildings, preferably animal housings, having a plurality of mutually connected layer elements (13), which are corrugated to form alternately adjacent wave troughs (20) and wave peaks (21), and having flow channels (30) between respectively adjacent corrugated layer elements (13), wherein the layer elements (13) are, for the one part, of closed-wall configuration and, for the other part, of permeable configuration, to form at least partially closed and at least partially permeable flow channels (30), and/or at least partially closed and at least partially permeable wave troughs (20) and wave peaks (21), between adjacent layer elements (13), wherein directions of longitudinal extent (19) of the alternately adjacent wave troughs (20) and wave peaks (21) run transversely to the layer elements (13), and wherein the wave troughs (20) and wave peaks (21) of the layer elements (13) are provided with a course of the directions of longitudinal extent (19), which course of the directions of longitudinal extent (19) has several changes of direction.

2. The trickle body as claimed in claim 1, wherein the course of the directions of longitudinal extent (19) is a zigzagging and/or serpentine course.

3. The trickle body as claimed in claim 1, wherein the wave troughs (20) and wave peaks (21) of the layer elements (13) have outer portions (22, 23), which emanate from each of the opposite longitudinal side edges (14, 15) of the layer elements (13) and run transversely to the longitudinal side edges (14, 15), and the outer portions (22, 23) have oppositely inclined inner portions (24, 25) which continue to the middle of the layer elements (23), wherein the inner portions (24, 25) meet in the region of apices (26) lying on a longitudinal center plane of the layer elements (13).

4. The trickle body as claimed in claim 3, further comprising impermeable, closed wall regions (31) of the flow channels (30) and/or the wave troughs (20) and wave peaks (21) that extend over an inner region of the inner portions (24, 25) of the wave troughs (20) and the wave peaks (21) of the layer elements (13) and/or flow channels (30) of the layer elements (13).

5. The trickle body as claimed in claim 3, wherein the layer elements (13) are assembled such that they are alternately turned in such a way that the oblique inner portions (24, 25) of mutually facing wave troughs (20) and wave peaks (21) of adjacent layer elements (13) are inclined in opposite directions and/or run in cross-cross arrangement.

6. The trickle body as claimed in claim 1, wherein the waves of the layer elements (13), namely the wave troughs (20) and wave peaks (21), have trapezoidal cross sections, wherein webs (28, 29) of the waves, the wave troughs (20) and/or the wave peaks (21), are of continuously closed or close-walled configuration.

7. The trickle body as claimed in claim 6, wherein the webs lie on parallel planes, namely a front plane (16) and a rear plane (17), of the layer elements (13).

8. The trickle body as claimed in claim 1, wherein the waves of the respective layer element (13) have trapezoidal cross sections having respectively two oppositely obliquely inclined side members (27), which are connected by a common web (28, 29) that runs parallel to the planes (16, 17) of the relevant layer element (13), wherein only the side members (27) of the wave troughs (20) and/or wave peaks (21) are in part of permeable configuration.

9. The trickle body as claimed in claim 1, wherein the permeably configured parts of the layer elements (13), namely of the flow channels (30) and/or the wave troughs (20) and wave peaks (21) of the adjacent layer elements (13), are of meshed and/or latticed configuration or are formed by a mesh and/or lattice structure.

10. The trickle body as claimed in claim 1, wherein the corrugated layer elements (13) are injection molded from plastic.

11. The trickle body as claimed in claim 10, wherein all of the layer elements (13) are the same and/or configured the same.

12. The trickle body as claimed in claim 11, wherein all of the layer elements (13) are injection molded from plastic are the same or configured the same.

13. The trickle body as claimed in claim 1, wherein corrugation heights (18) of the layer elements (13) are greater than 12 mm.

14. The trickle body as claimed in claim 13, wherein the corrugation heights (18) of the layer elements (13) measure 12.5 mm to 30 mm.

15. The trickle body as claimed in claim 14, wherein the corrugation heights (18) of the layer elements (13) measure 13.5 mm to 18 mm.

16. The trickle body as claimed in claim 14, wherein the corrugation heights (18) of the layer elements (13) measure 20.5 mm to 30 mm.

17. The trickle body as claimed in claim 13 wherein corrugation heights (18) of the layer elements (13) are greater than 20 mm.

* * * * *